United States Patent
Shemer et al.

(10) Patent No.: US 8,122,912 B2
(45) Date of Patent: Feb. 28, 2012

(54) GAS FLOW RESTRICTOR

(76) Inventors: Moshe Shemer, Evanston, IL (US);
Bernard H. Azrikam, Niles, IL (US)

( * ) Notice: Subject to any disclaimer, the term of this patent is extended or adjusted under 35 U.S.C. 154(b) by 0 days.

(21) Appl. No.: 12/805,266

(22) Filed: Jul. 21, 2010

(65) Prior Publication Data
US 2012/0018002 A1    Jan. 26, 2012

(51) Int. Cl.
*F15D 1/04* (2006.01)
(52) U.S. Cl. ............... 138/46; 138/89; 138/43; 138/45; 251/206
(58) Field of Classification Search .............. 138/46, 138/45, 89, 43; 251/206, 207
See application file for complete search history.

(56) References Cited

U.S. PATENT DOCUMENTS

| | | | | |
|---|---|---|---|---|
| 1,617,614 A | * | 2/1927 | York | 138/46 |
| 2,118,295 A | * | 5/1938 | Crawford et al. | 138/42 |
| 2,340,293 A | * | 2/1944 | Balleisen | 138/45 |
| 2,370,965 A | * | 3/1945 | Kahn | 138/46 |
| 4,024,889 A | * | 5/1977 | Smith et al. | 137/517 |
| 4,315,431 A | * | 2/1982 | Hawk | 73/203 |
| 4,431,028 A | * | 2/1984 | Hendrick | 137/625.3 |
| 4,506,423 A | | 3/1985 | Nakamura et al. | 29/890.14 |
| 5,392,825 A | | 2/1995 | Mims et al. | 137/614.2 |
| 5,402,821 A | | 4/1995 | Harstad | 137/556 |
| 5,503,549 A | | 4/1996 | Iasella | 431/18 |
| 6,357,483 B1 | | 3/2002 | Kobayashi | 138/40 |
| 6,390,134 B1 | * | 5/2002 | Hanby | 138/44 |
| 6,910,673 B2 | | 6/2005 | Green et al. | 251/118 |
| 2005/0104024 A1 | | 5/2005 | Oliver | 251/206 |

FOREIGN PATENT DOCUMENTS
GB    2250609 A    6/1992
* cited by examiner

*Primary Examiner* — Patrick F Brinson
(74) *Attorney, Agent, or Firm* — Richard C. Litman

(57) ABSTRACT

The gas flow restrictor includes a cylindrical body having threads for mounting the body in a gas flow line. One end of the body is closed and includes a plurality of angularly spaced plugs having a predefined diameter that may be the same or different from each other. Each plug is selectively removable from a correspondingly sized orifice, singly or in combination, to set the desired gas flow and thereby reduce incoming gas flow pressure through the lines.

9 Claims, 4 Drawing Sheets

GAS FLOW RESTRICTOR

BACKGROUND OF THE INVENTION

1. Field of the Invention

The present invention relates to gas flow systems, and more specifically to a gas flow restrictor for selective setting of gas flow pressure as required by the user in order to conserve energy.

2. Description of the Related Art

Many homes utilize natural gas for stoves and heating. In many instances, natural gas is a more economical alternative to electricity, which is a significant consideration for the homeowner in the current economic clime. However, most conventional homes do not have a means of regulating the gas flow through the source or the main gas valve.

A typical dwelling that employs natural gas usually includes a main gas valve that is opened or closed to supply gas to a water heater, boiler, furnace, heating system and/or gas stove. Apart from safety mechanisms for emergency shut off, the gas valve mainly opens or closes the gas flow. This amount of control is sufficient to supply the gas where needed. However, the gas flow is usually set at a predetermined pressure that is often higher than required for supplying appliances with gas. This can lead to significant energy wastes and undue stresses on the gas lines. In the current environment where energy conservation is paramount, any waste is cause for major concern.

In light of the above, it would be a benefit in the art of gas flow systems to provide a device that selectively reduces gas pressure in the supply to thereby regulate usage in a more conservative manner. Thus, a gas flow restrictor solving the aforementioned problems is desired.

SUMMARY OF THE INVENTION

The gas flow restrictor includes a cylindrical body having threads for mounting the body in a gas flow line. One end of the body is closed and includes a plurality of angularly spaced plugs having a predefined diameter that may be the same or different from each other. Each plug is selectively removable from a correspondingly sized orifice, singly or in combination, to set the desired gas flow and thereby reduce incoming gas flow pressure through the lines.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
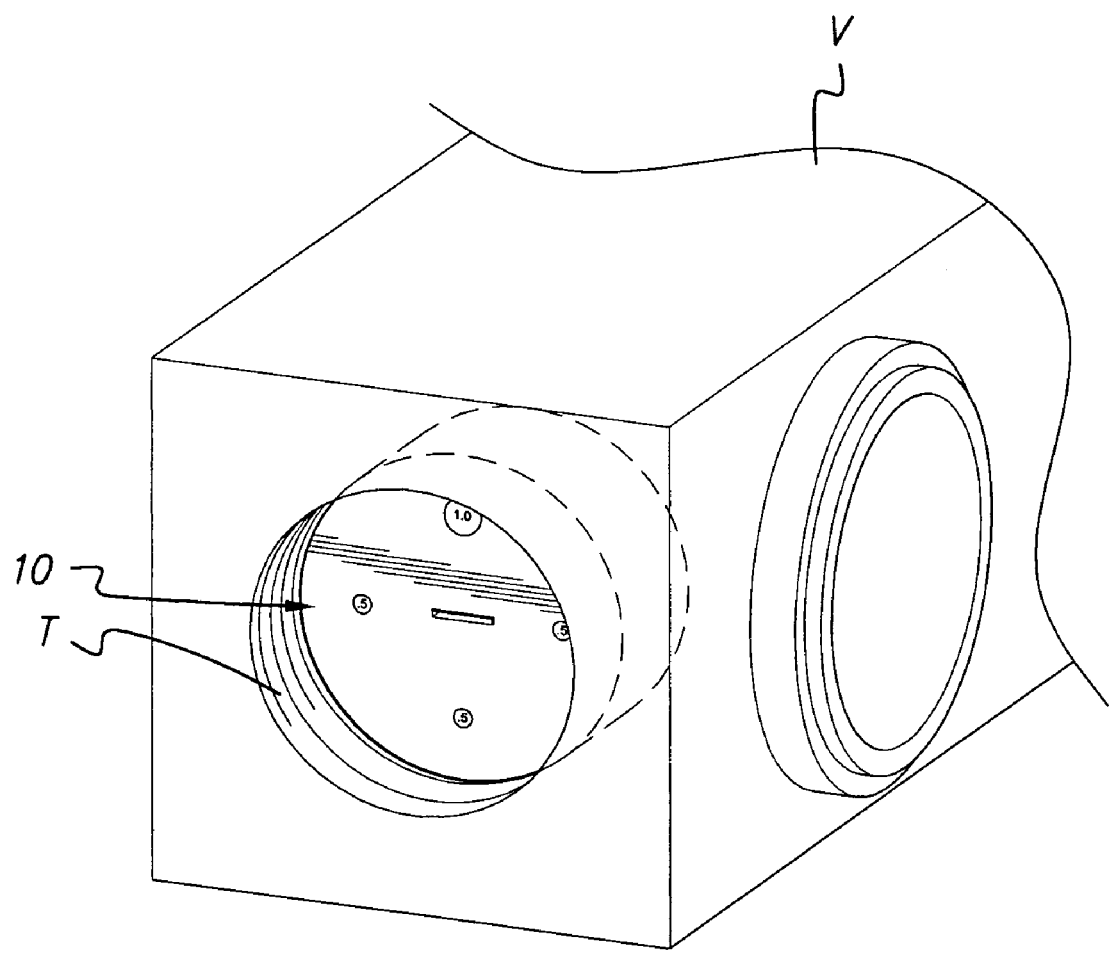
FIG. 1 is an environmental, perspective view of a gas flow restrictor according to the present invention.
Figure 2:
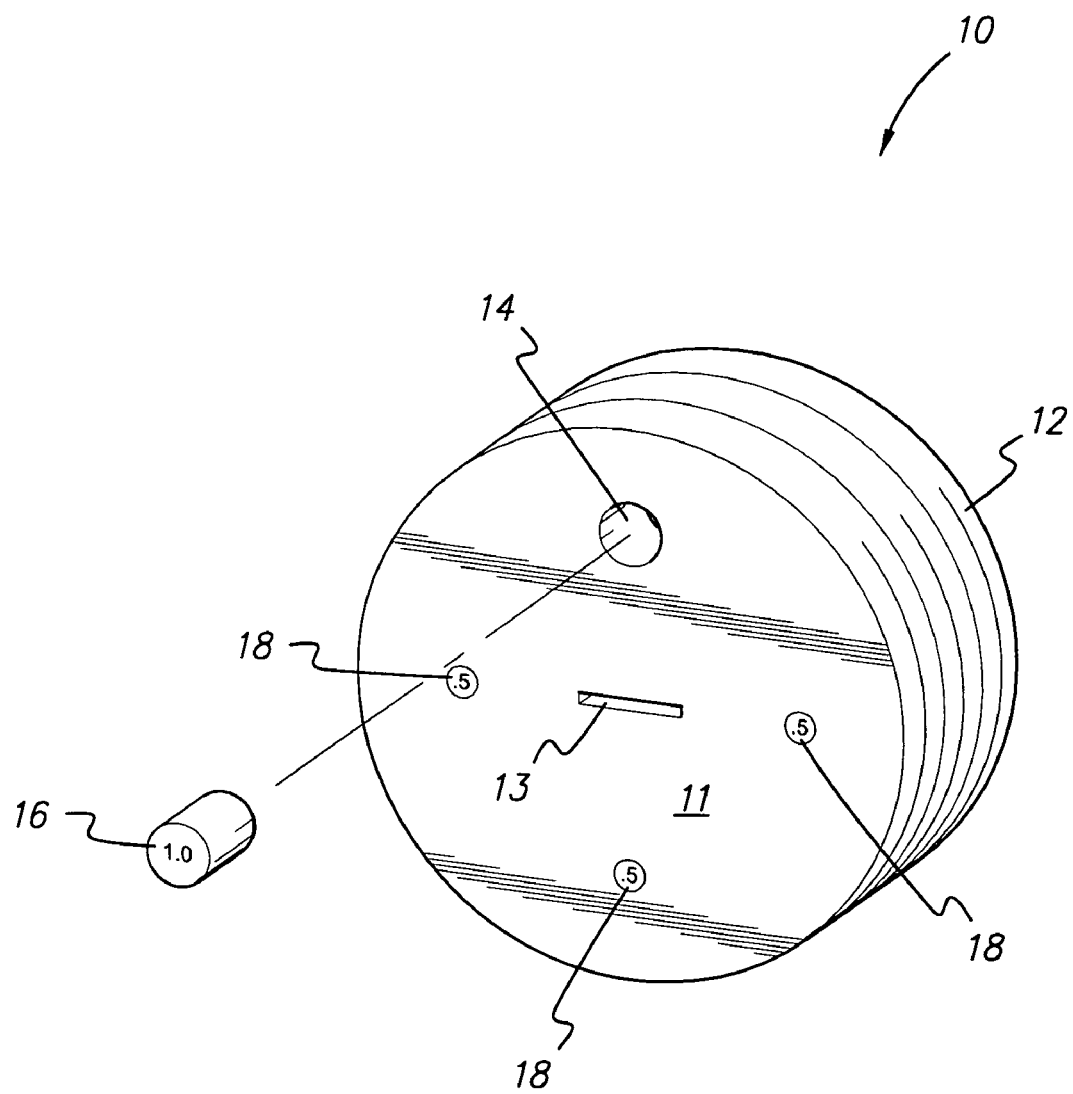
FIG. 2 is a perspective view of the gas flow restrictor with an exemplary showing of one of the plugs removed from a corresponding orifice.

The present invention relates to a gas flow restrictor, a first embodiment of which is generally referred to by reference number 10 in the drawings, for selectively reducing gas flow in the gas lines. As shown in FIGS. 1 and 2, the gas flow restrictor 10 includes a substantially cylindrical body having threads 12 on the outer surface thereof. The cylindrical body is preferably substantially hollow to reduce the weight thereof and minimize material costs. Alternatively, the cylindrical body may be solid for a more robust and durable configuration if desired. The threads 12 permit the gas flow restrictor 10 to be mounted to the later half of the threads T on the inlet side of the main gas valve V as exemplarily shown in FIG. 1. The remainder of the threads T accommodates connection to a gas line. However, it is to be understood that the gas flow restrictor 10 may be mounted or installed anywhere along the gas line upstream and downstream of the gas valve V. In addition, the threads 12 are not limited to being on the outside. The gas flow restrictor 10 may include internal threads or a combination of both internal and external threads to accommodate installation in a variety of different gas line configurations.

The cylindrical body has a closed end 11 that includes a plurality of angularly spaced, first and second plugs or stoppers 16, 18 mounted thereon. The plugs 16, 18 are preferably solid, cylindrical pellets insertably mounted to respective orifices or holes 14 in the closed end 11 by threads or press fit engagement. Both the plugs 16, 18 and the respective orifices 14 are dimensioned to permit a predefined flow of gas through the gas line. The orifices 14 restrict the gas flow and thereby reduce the pressure of incoming gas flow at the user end, e.g., boiler, stove, etc. The closed end 11 of the cylindrical body also includes a slot or groove 13 where a tool, such as a flat head screwdriver, may be used to mount the gas flow restrictor 10 at the desired location.

In the embodiment shown in FIGS. 1 and 2, the first plug 16 is relatively larger dimensioned than the second plugs 18 and includes a representative indicium on the top thereof. The indicium represents the predefined reduction of gas flow pressure that results if the first plug 16 is removed from the corresponding orifice 14, e.g., a 1.0 wc (water column). The second plugs 18 are similarly configured, but they are dimensioned for a lesser incremental reduction of pressure, e.g., 0.5 wc.

With the above configuration, the user may selectively remove one or a combination of plugs 16, 18 for a desired pressure reduction. For example, if a 0.5 wc pressure reduction is desired, then one of the second plugs 18 is removed prior to installation in the gas line. If a 1.0 wc pressure reduction is desired, then the first plug 16 or two of the second plugs 18 is/are removed. If a 1.5 wc reduction is desired, then the first plug 16 and one of the second plugs 18 are removed, etc., all the way to the maximum pressure reduction defined by the sum of all the plugs 16, 18. Thus, the user can easily set the pressure reduction best suited to the required energy needs and thereby conserve energy.

Figure 3:
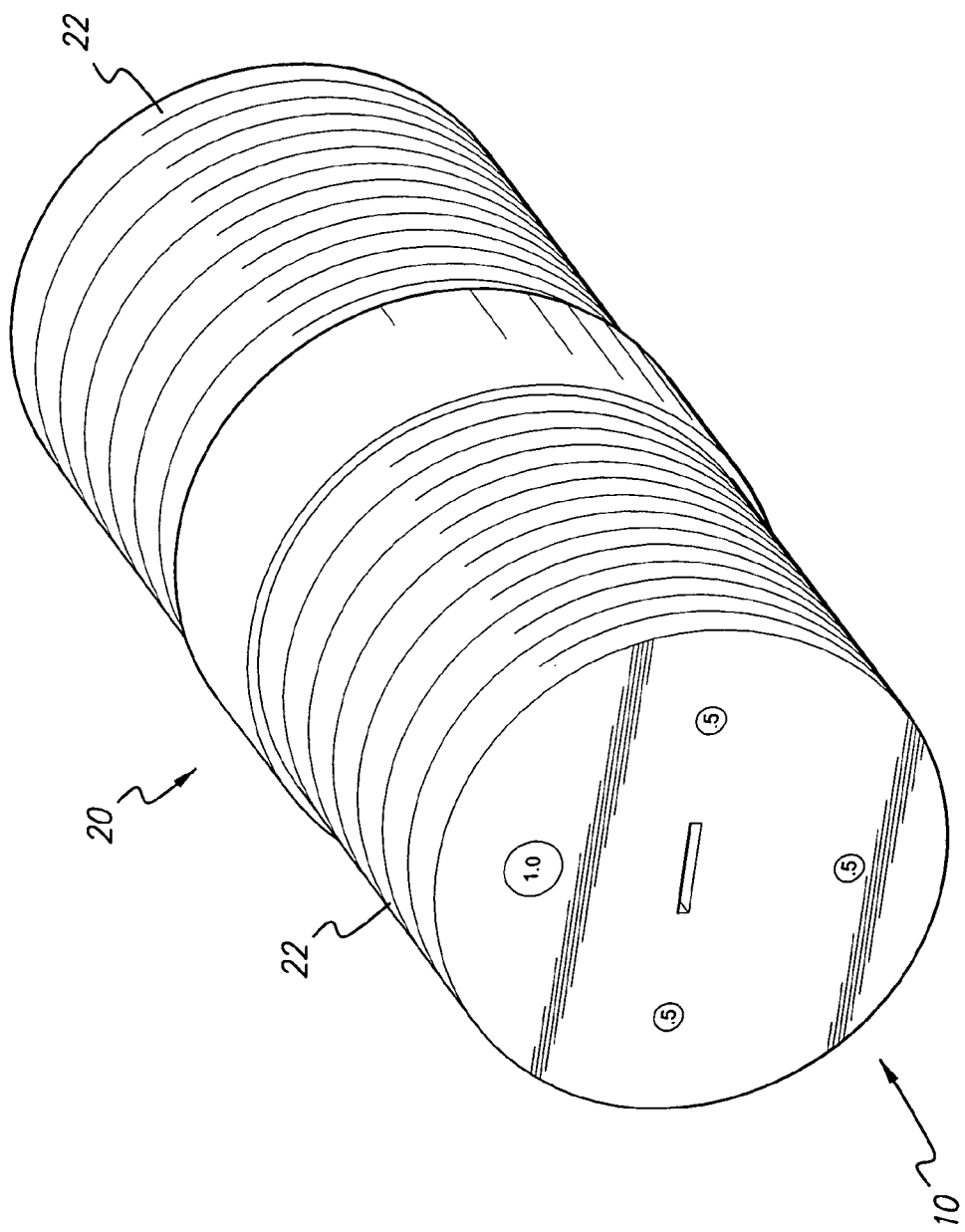
FIG. 3 is a perspective view of an adapter having the gas flow restrictor integrated therewith.

Turning to FIG. 3, the gas flow restrictor 10 may be incorporated into an adapter 20. The adapter 20 includes threads 22 at both ends so as to connect two separate gas lines, a line to a component or two separate components. In this configuration, the gas flow restrictor 10 may be an integral, one-piece section of the adapter 20 or a separate element installed on the adapter 20.

Figure 4:
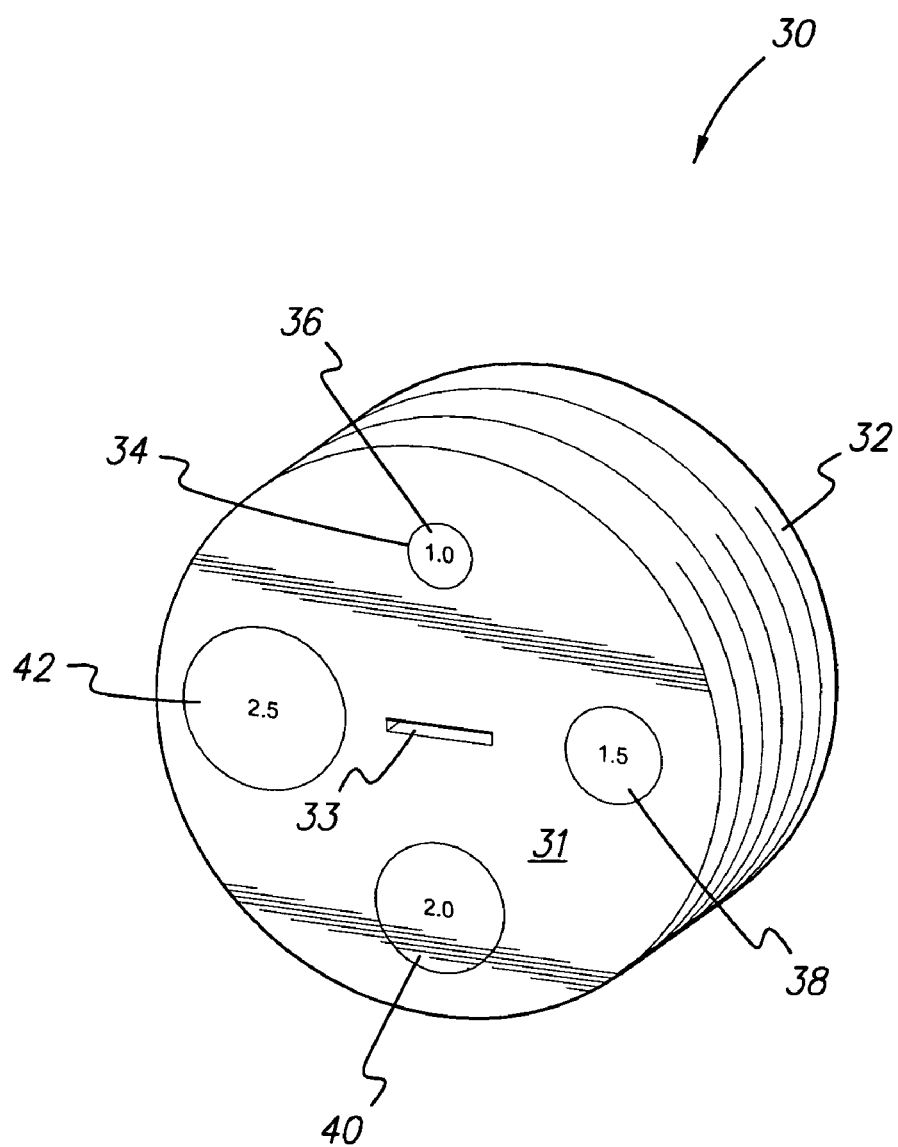
FIG. 4 is a perspective view of an alternative embodiment of a gas flow restrictor according to the present invention.

FIG. 4 shows an alternative embodiment of a gas flow restrictor, generally referred to by reference number 30. The gas flow restrictor 30 is similarly configured as the gas flow restrictor 10 except for the dimensions of the plugs and orifices. In that regard, the gas flow restrictor 30 includes a cylindrical, substantially hollow body having a closed end 31; threads 32; a plurality of angularly spaced first, second, third and fourth plugs or stoppers 36, 38, 40, 42 mounted to respective orifices 34; and a slot 33 for a tool to mount the gas flow restrictor 30 at a desired location along the gas line.

In this embodiment, only one of the plugs 36, 38, 40, 42 is typically removed for the desired pressure reduction. As shown in FIG. 4, each subsequent plug is dimensioned larger than the previous plug in the clockwise direction. For example, the first plug 36 is dimensioned for a 1.0 wc reduction, the second plug 38 for a 1.5 wc reduction, the third plug 40 for a 2.0 wc reduction and the fourth plug 42 for a 2.5 wc reduction. If a larger reduction is desired, then any combination of the plugs may be removed to match. In all other respects, the gas flow restrictor 30 functions similar to the gas flow restrictor 10.

The following describes how to use the gas flow restrictor 10, 30. Once the user or technician has determined the required amount of pressure needed to supply the appliances within a dwelling, the user removes one or more of the plugs corresponding to the predetermined or desired reduction. Then the user installs the gas flow restrictor 10, 30 along the gas line.

Thus, it can be seen that the gas flow restrictor 10, 30 can be easily adjusted for more efficient consumption of natural gas and thereby conserve energy. The gas flow restrictor 10, 30 permits the user to limit gas flow to only what is needed.

It is to be noted that the gas flow restrictor 10, 30 encompasses a variety of alternatives. For example, a select number of plugs can be removed so that a lever mechanism can be used to selectively cover a respective orifice to control the gas flow. As a further alternative, a lever mechanism can be used to rotate the gas flow restrictor 10, 30 to expose one or combination of orifices. The plugs and orifices can be any desired shape as long as they define a predefined gas flow. The indicia on the plugs may also be color coded to represent the predefined pressure reduction. Moreover, it is to be understood that the gas flow restrictor 10, 30 would be configured to conform to regulations governing installation of gas lines in a dwelling, which includes the size and material composition thereof.

It is to be understood that the present invention is not limited to the embodiments described above, but encompasses any and all embodiments within the scope of the following claims.

We claim:

1. A gas flow restrictor for use in a natural gas line supplying natural gas to appliances in a building at a given pressure, the gas flow restrictor comprising:
   a one-piece, unitary cylindrical body having a closed end and threads adapted for mounting the cylindrical body to the gas line, the closed end having a plurality of orifices defined therein, wherein each of the orifices has a distinct size;
   a plurality of removable plugs angularly spaced around the closed end, each of the plugs being insertably mounted and fitted within a corresponding one of the orifices, each of the orifices being dimensioned to provide a predetermined gas flow at a pressure less than the given pressure; and
   a slot centrally disposed in the closed end for accommodating a tool for installation;
   wherein selective removable of at least one of the plugs restricts gas flow to a desired pressure level less than the given pressure to facilitate efficient use of the supplied natural gas.

2. The gas flow restrictor according to claim 1, further comprising indicia disposed on a top surface of each of said plugs, said indicia representing a predetermined pressure reduction by removable of said plug.

3. The gas flow restrictor according to claim 1, wherein said plurality of plugs comprises a first plug and a plurality of second plugs, said first plug having a larger diameter than said second plugs, each of said plurality of second plugs having the same diameter.

4. The gas flow restrictor according to claim 1, wherein said plurality of plugs comprises first, second, third and fourth plugs, said second plug having a larger diameter than said first plug, said third plug having a larger diameter than said second plug, and said fourth plug having a larger diameter than said third plug.

5. The gas flow restrictor according to claim 1, wherein the plurality of orifices have diameters progressively increasing in size, each of the orifices having one of said plugs corresponding in diameter to the orifice removably installed therein.

6. The gas flow restrictor according to claim 1, wherein said cylindrical body is substantially hollow, the gas flow restrictor having a circular plate disposed in the cylindrical body to form the closed end.

7. The gas flow restrictor according to claim 1, wherein said cylindrical body is solid, said cylindrical body having a plurality of through bores defined therein defining the orifices and defining passages for the flow of gas through said cylindrical body when said plugs are removed from the orifices.

8. A method of reducing gas pressure in a natural gas line supplying natural gas to appliances in a building at a given pressure, the method comprising the steps of:
   providing a gas flow restrictor having a one-piece, unitary cylindrical body with threads and a closed end, the closed end having a plurality of removable plugs angularly spaced around the closed end, each of the plugs being insertably mounted within a corresponding orifice, each of the orifices being dimensioned to provide a predetermined gas flow at a pressure less than the given pressure;
   selectively removing at least one of the plugs for a desired level of pressure reduction; and
   mounting the gas flow restrictor to the gas line via the threads and a tool slot centrally disposed on the closed end.

9. A gas flow restrictor kit for use in a natural gas line supplying natural gas to appliances in a building at a given pressure, the gas flow restrictor kit comprising:
   a one-piece, unitary cylindrical body having a closed end and threads adapted for mounting the cylindrical body to the gas line, the closed end having a plurality of orifices defined therein, wherein each of the orifices has a distinct size, a slot centrally disposed in the closed end for accommodating a tool for installation; and
   a plurality of removable plugs, each of the plugs being correspondingly sized to a respective orifice and selectively insertable within a corresponding one of the orifices, each of the orifices being dimensioned to provide a predetermined gas flow at a pressure less than the given pressure
   wherein selective insertion of at least one of the plugs restricts gas flow to a desired pressure level less than the given pressure to facilitate efficient use of the supplied natural gas.

* * * * *